United States Patent
Mori et al.

(10) Patent No.: US 6,996,005 B2
(45) Date of Patent: Feb. 7, 2006

(54) NONVOLATILE MEMORY CARD

(75) Inventors: Makoto Mori, Kodaira (JP); Seisuke Hirosawa, Kodaira (JP); Atsushi Shikata, Higashimurayama (JP)

(73) Assignee: Renesas Technology Corp., Tokyo (JP)

( * ) Notice: Subject to any disclaimer, the term of this patent is extended or adjusted under 35 U.S.C. 154(b) by 107 days.

(21) Appl. No.: 10/721,873

(22) Filed: Nov. 26, 2003

(65) Prior Publication Data

US 2004/0228161 A1 Nov. 18, 2004

(30) Foreign Application Priority Data

Feb. 26, 2003 (JP) .............................. 2003-048498

(51) Int. Cl.
*G06K 19/07* (2006.01)
(52) U.S. Cl. ........................ 365/185.04; 365/185.03; 365/185.33; 711/150; 711/155; 711/164
(58) Field of Classification Search .......... 365/185.04, 365/185.03, 185.33; 711/150, 155, 164
See application file for complete search history.

(56) References Cited

U.S. PATENT DOCUMENTS 5,592,619 A 1/1997 Shona ......................... 395/186
5,606,660 A 2/1997 Estakhri et al. ........ 395/183.14
2004/0054847 A1 * 3/2004 Spencer et al. ............. 711/104

FOREIGN PATENT DOCUMENTS

| JP | 363244231 A | * | 10/1988 |
| JP | 405143315 A | * | 6/1993 |
| JP | 7-44672 | | 2/1995 |
| JP | 11-265283 | | 9/1999 |
| JP | 02000082122 A | * | 3/2000 |
| JP | 02002251595 A | * | 9/2002 |
| JP | 2003-085509 | | 3/2003 |
| JP | 02003085509 A | * | 3/2003 |

* cited by examiner

*Primary Examiner*—Viet Q. Nguyen
(74) *Attorney, Agent, or Firm*—Miles & Stockbridge PC

(57) ABSTRACT

The present invention provides a nonvolatile memory card in which a program is added, modified, changed, or the like by selecting arbitrary firmware on a flash memory from a plurality of pieces of firmware on flash memories. In a memory card, in addition to a program stored in a built-in ROM, firmware on flash memories as programs for adding, changing, modifying, or the like of a function such as a patch program are stored. Firmware on a flash memory which is desired to be made valid is set in a parameter sector or the like and is loaded into an external RAM, and the CPU of a control logic executes a process.

4 Claims, 6 Drawing Sheets

NONVOLATILE MEMORY CARD

BACKGROUND OF THE INVENTION

The present invention relates to a memory card and, more particularly, to a technique effectively applied to realization of multiple functions of a memory card using a nonvolatile memory.

As a storage device of a personal computer, a multifunctional peripheral, or the like, a memory card is being rapidly spread. In association with a request for higher performance in recent years, as a semiconductor memory to be mounted on a memory card, for example, a nonvolatile memory such as a flash memory which can be electrically erased and rewritten in a lump and can hold a large amount of data is used.

In such a memory card, a control program is stored in a ROM (Read Only Memory) or the like provided in the memory card. In some cases, firmware such as a patch program for a control program and an addition control program for extending the function of a control program stored in a ROM is stored in a flash memory.

Firmware (hereinbelow, also called firmware on a flash memory) can be rewritten freely many times. A change, addition of a function, and the like can be easily freely made on firmware on a flash memory even assembled in a product.

In some multimedia cards, validity or invalidity of a command and a data format is set by firmware (for example, Japanese Unexamined Patent Publication No. 2003-085509).

Further, in some IC cards, a command table is provided in a nonvolatile memory such as an EEPROM (Electrically Erasable and Programmable ROM) in addition to a command table in a ROM. In the case where the command table in the ROM is known or may be known by a third party, the command table in the nonvolatile memory is used (for example, Japanese Unexamined Patent Publication No. Hei 7 (1995)-44672).

SUMMARY OF THE INVENTION

The inventor herein, however, has found that the memory card as described above has the following problems.

Since firmware on a flash memory is developed in a RAM (Random Access Memory) used as a work area of the CPU provided for a controller at the time of start-up or the like of a memory card, the data capacity of the firmware on a flash memory which can be developed in the RAM is limited. Consequently, only one firmware on a flash memory is provided.

Therefore, an addition function, a program correction, and the like performed by the firmware on a flash memory are also limited, and it is feared that convenience of the memory card deteriorates.

In an IC card having a command table in a nonvolatile memory, the nonvolatile memory and a controller are formed in a single semiconductor chip. Further, although an EEPROM can be usually accessed at random on a byte unit basis, in a memory card in which a nonvolatile memory and a controller are formed in different semiconductor chips, an access to the nonvolatile memory is, for example, a sequentially access in a 512-byte unit.

Therefore, in the case of a memory card, in a configuration of storing firmware on a flash memory in a nonvolatile memory and reading the firmware on the flash memory by the controller, the reading speed is different from the operation speed of the controller. It causes a problem of a large overhead in data reading speed and data transferring speed.

An object of the invention is to provide a memory card having a plurality of pieces of firmware on flash memories, in which a program can be added, modified, changed or the like by selecting arbitrary firmware on a flash memory.

The above and other objects and novel features of the invention will become apparent from the description of the specification and the appended drawings.

An outline of representative one of inventions disclosed in the specification will be briefly described as follows.

The invention provides a nonvolatile memory card including: a nonvolatile semiconductor memory having a plurality of nonvolatile memory cells and capable of storing predetermined information; and a controller for giving an instruction of operation of the nonvolatile semiconductor memory on the basis of a command issued from the outside, wherein: the nonvolatile semiconductor memory can store two or more pieces of firmware; and the controller has a volatile semiconductor memory for storing the firmware, when a firmware selecting instruction is made valid, the controller selects one arbitrary firmware from two or more pieces of firmware which can be stored in the volatile semiconductor memory, stores it in the volatile semiconductor memory, accesses the volatile semiconductor memory and executes a process by the firmware.

DESCRIPTION OF THE PREFERRED EMBODIMENTS OF THE INVENTION

Embodiments of the invention will be described in detail hereinbelow with reference to the drawings.

Figure 1:
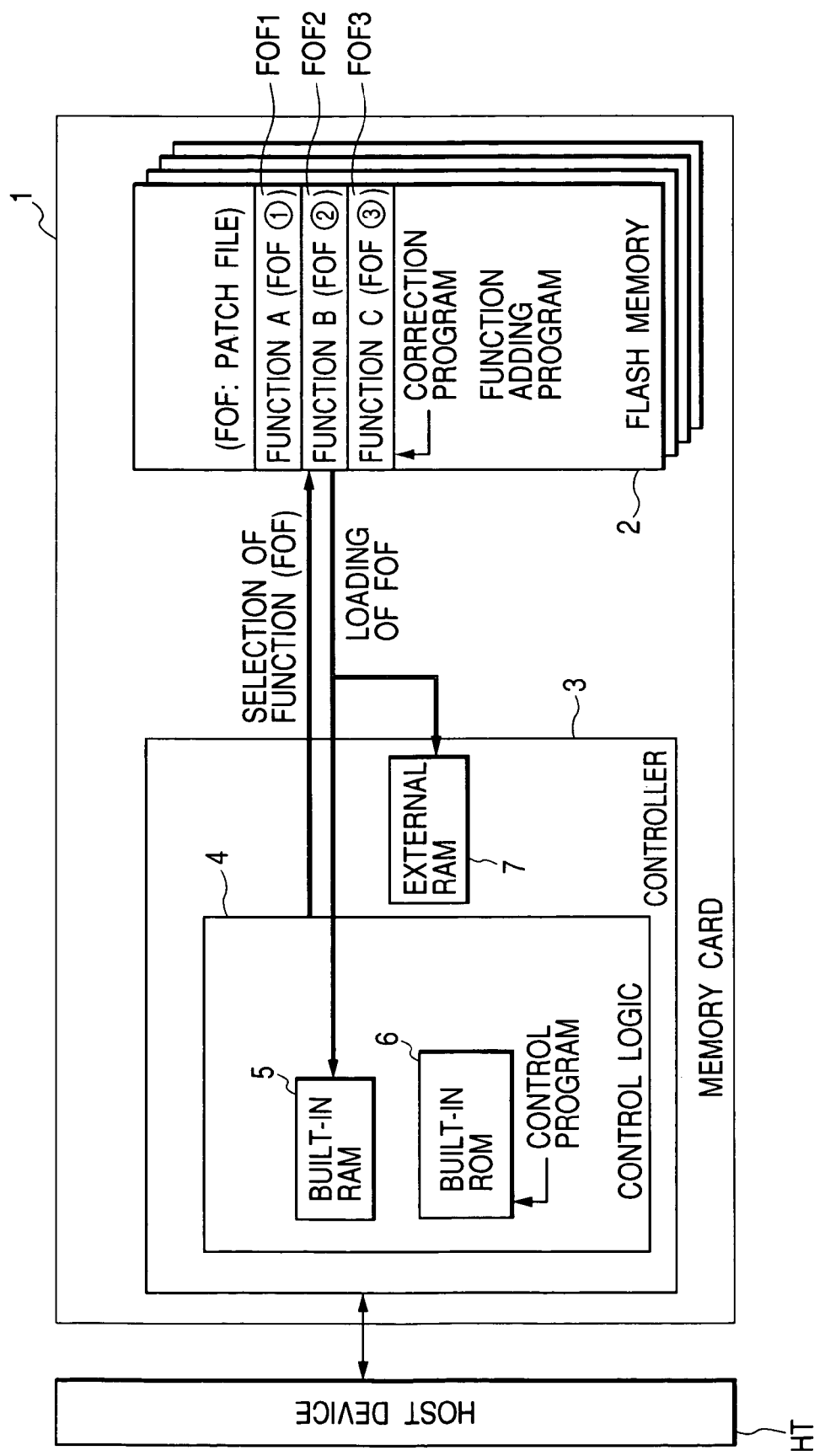
FIG. 1 is a block diagram of a memory card according to an embodiment of the invention.
Figure 2:
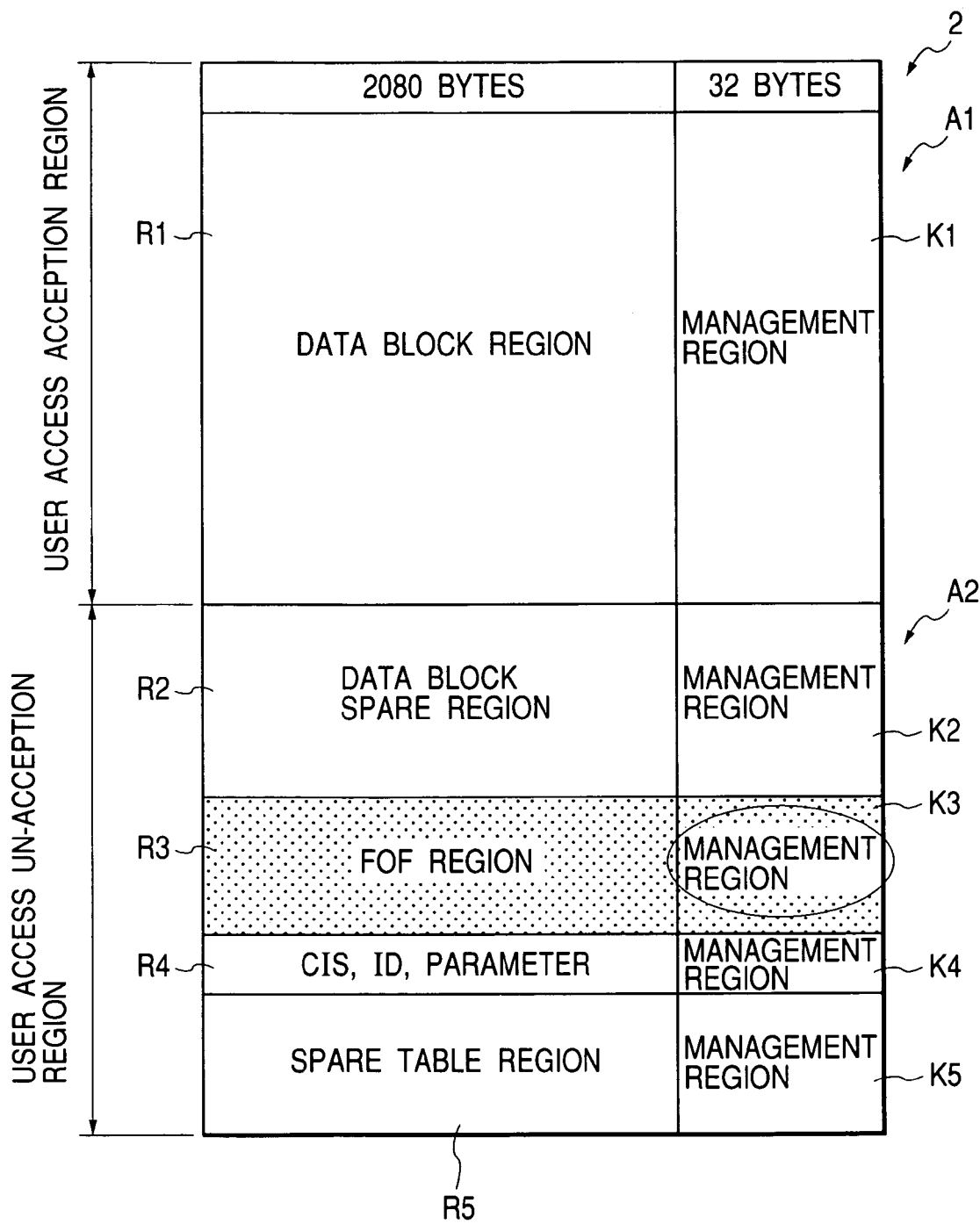
FIG. 2 is a diagram illustrating the internal configuration of a flash memory provided for the memory card of FIG. 1.
Figure 3:
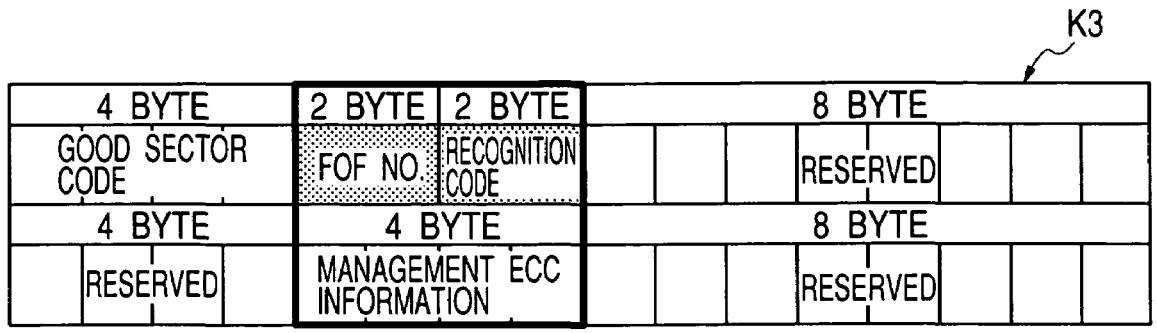
FIG. 3 is a diagram showing the configuration of a management area provided for the flash memory of FIG. 2.
Figure 4:
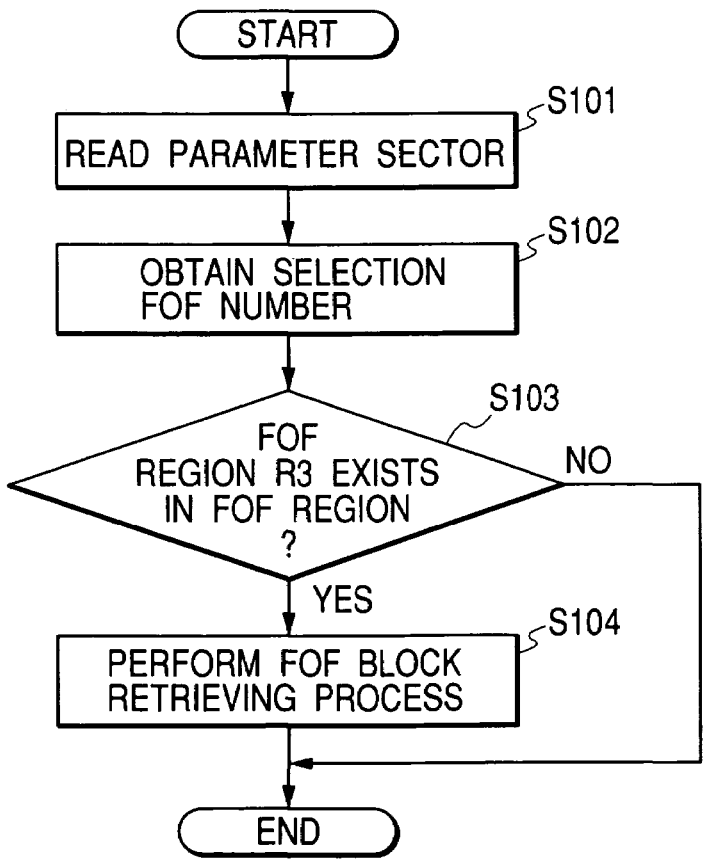
FIG. 4 is a flowchart of a process of selecting firmware on a flash memory in accordance with a parameter of the memory card of FIG. 1.
Figure 5:
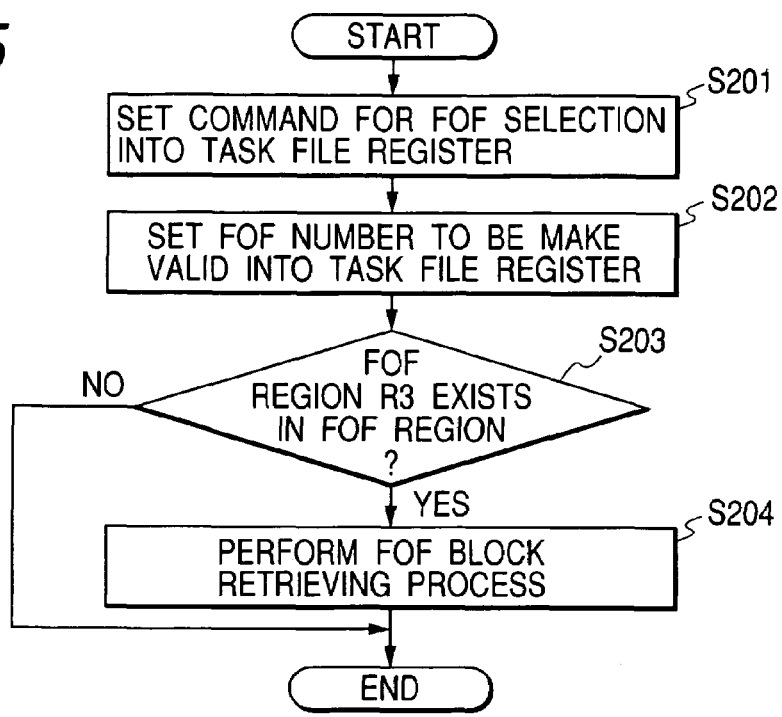
FIG. 5 is a flowchart of a process of selecting firmware on a flash memory by using a firmware-on-flash-memory selecting command according to the memory card of FIG. 1 and loading the firmware.
Figure 6:
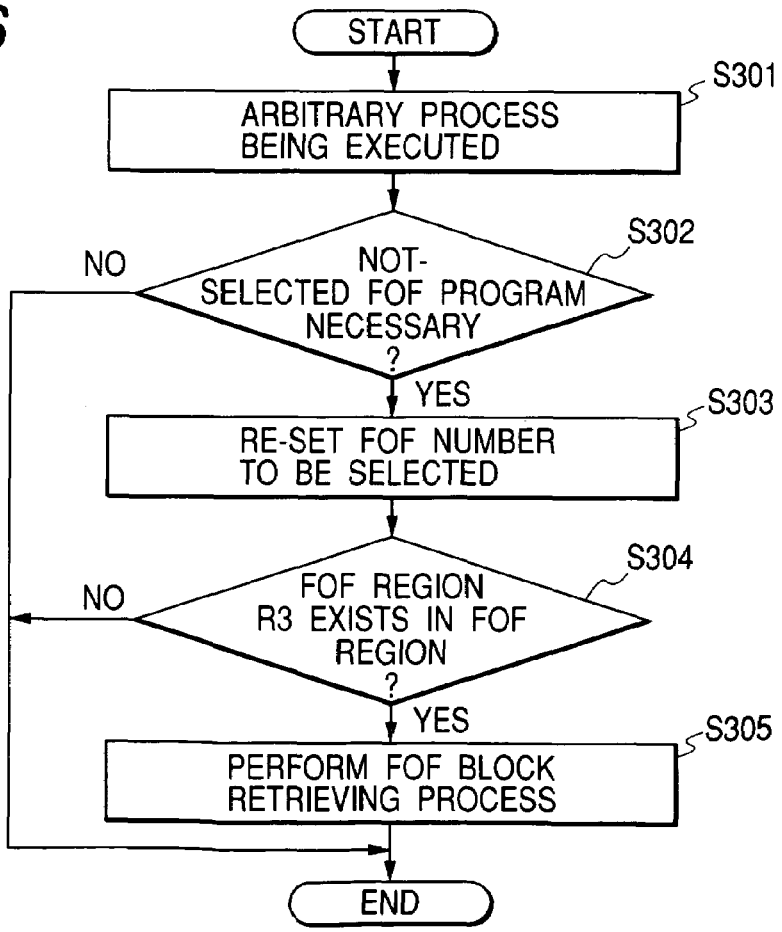
FIG. 6 is a flowchart of a process of selecting firmware on a flash memory during execution of a program in the memory card of FIG. 1.
Figure 7:
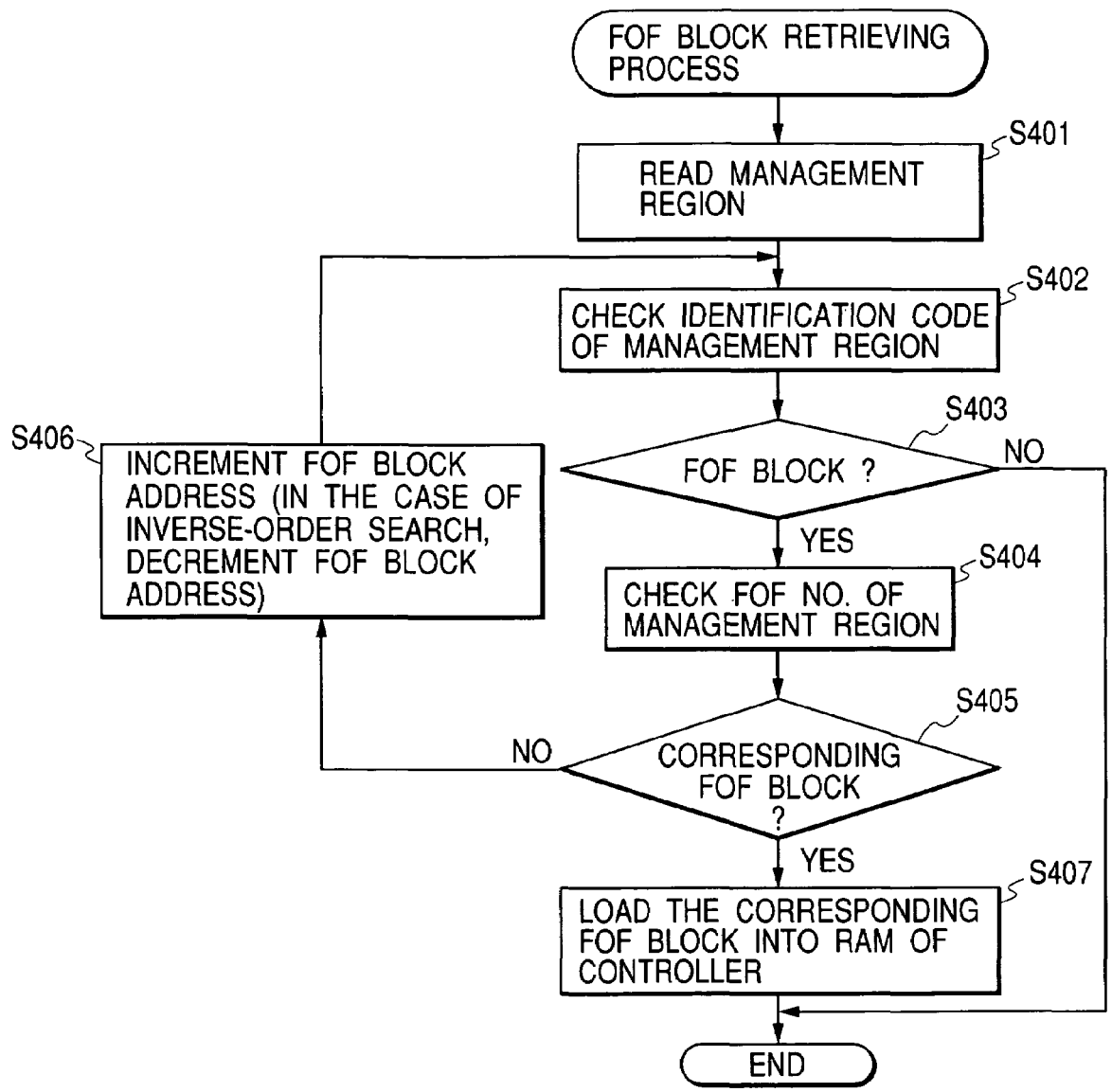
FIG. 7 is a flowchart of retrieving the selected firmware on the flash memory by the memory card of FIG. 1 by using an identification code.
Figure 8:
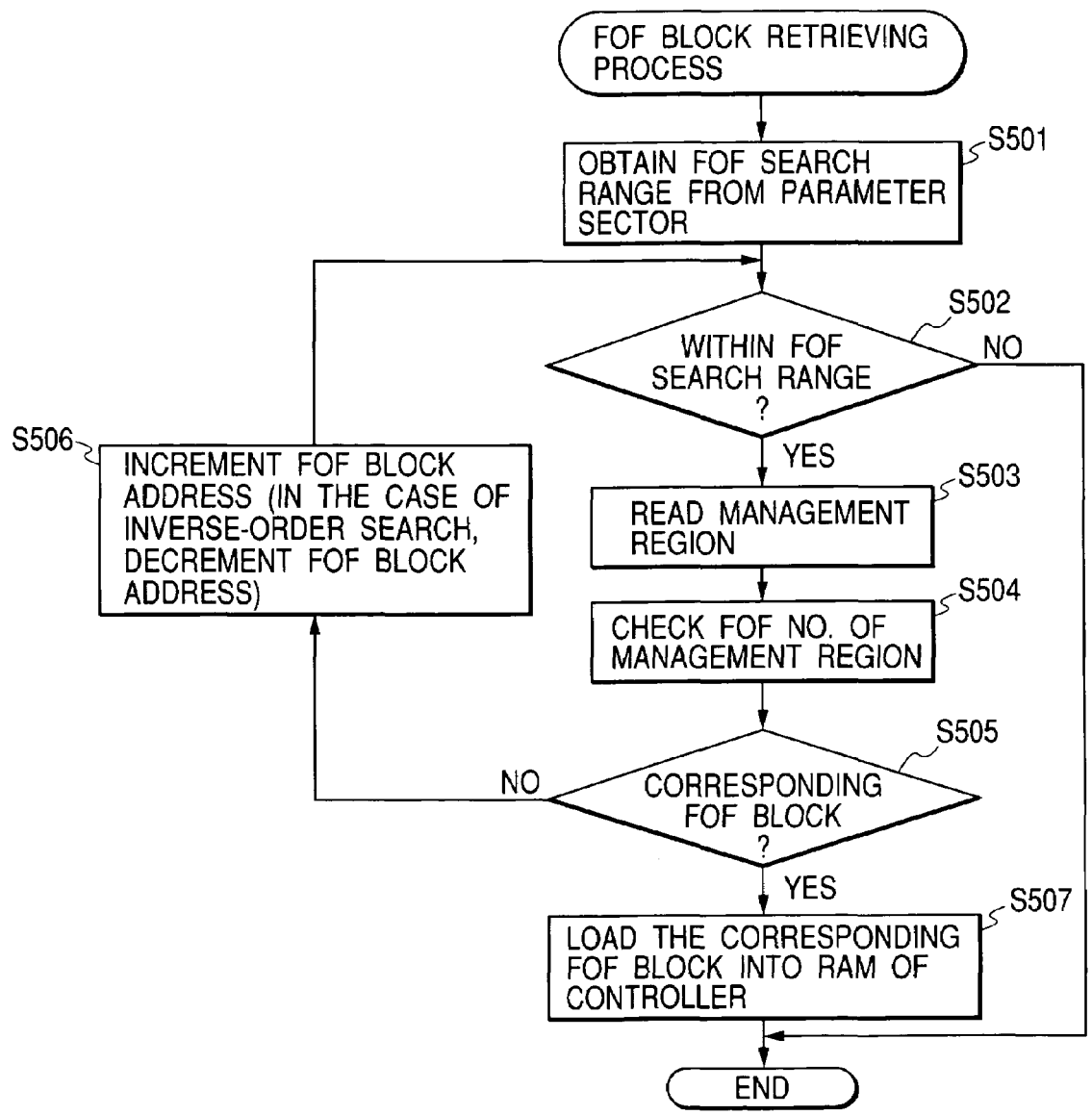
FIG. 8 is a flowchart of designating a search range and retrieving the selected firmware on the flash memory by the memory card of FIG. 1.

FIG. 1 is a block diagram of a memory card according to an embodiment of the invention. FIG. 2 is a diagram illustrating the internal configuration of a flash memory provided for the memory card of FIG. 1. FIG. 3 is a diagram showing the configuration of a management area provided for the flash memory of FIG. 2. FIG. 4 is a flowchart of a process of selecting firmware on a flash memory in accordance with a parameter of the memory card of FIG. 1. FIG. 5 is a flowchart of a process of selecting firmware on a flash memory by using a firmware-on-flash-memory selecting command according to the memory card of FIG. 1 and loading the firmware. FIG. 6 is a flowchart of a process of selecting firmware on a flash memory during execution of a program in the memory card of FIG. 1. FIG. 7 is a flowchart of retrieving the selected firmware on the flash memory by the memory card of FIG. 1 by using an identification code. FIG. 8 is a flowchart of designating a search range and retrieving the selected firmware on the flash memory by the memory card of FIG. 1.

In the embodiment, a memory card 1 is used as an external storage medium of a host device HT in a digital video camera, a portable telephone, a portable music player, a personal computer, or the like.

The memory card 1 is constructed by, as shown in FIG. 1, a plurality of flash memories (nonvolatile semiconductor memories) 2, and a controller 3. The flash memory 2 is an electrically erasable and programmable nonvolatile semiconductor memory. Although a plurality of flash memories 2 is provided here, the number of the flash memories 2 may be at least one.

In the flash memory 2, firmware FOF1 to FOF3 on flash memories as programs for adding, changing, and modifying a function such as a patch program are provided separately from a program stored in a built-in ROM 6.

It is assumed here that the three pieces of firmware FOF1 to FOF3 on flash memories are stored in the flash memory 2. The number of pieces of firmware on flash memories stored in the flash memory 2 may be more than or less than three.

The controller 3 is connected to the host device HT, controls the flash memory 2, reads a program, data, or the like stored in the flash memory 2 and outputs it to the host device HT. The controller 3 performs an instruction of writing a program or data supplied from the host HT into the flash memory 2.

The controller 3 is constructed by a control logic 4, a built-in RAM (volatile semiconductor memory) 5, the built-in ROM 6, an external RAM 7, and the like. The control logic 4 performs all of controls in the controller 3.

The built-in RAM 5 is a volatile memory such as an SRAM (Static RAM) and is used as a work area of a CPU provided for the control logic 4. In the built-in ROM 6, a control program for operating the control logic 4 and the like is stored. The external RAM 7 is a memory into which one of the firmware FOF1 to FOF3 on flash memories stored in the flash memory 2 is loaded.

FIG. 2 is a diagram illustrating the internal configuration of the flash memory 2.

The flash memory 2 is constructed by a user access region A1 and a user access impossible region A2.

The user access region A1 consists of a data block region R1 which can be used by the user and a management region K1 in which data for managing the data block region is stored.

The user access impossible region A2 is a region which cannot be accessed by the user and is constructed by a data block spare region R2, an FOF region R3, a CIS/ID/parameter region R4, and a spare table region R5.

In the data block spare region R2, FOF region R3, CIS/ID/parameter region R4, and spare table region R5, management regions K2 to K5 are provided, respectively.

The data block spare region R2 is a region with which the data block region in which a failure occurs is replaced. The management region K2 stores information for managing the data block spare region R2.

The FOF region R3 is a region in which the firmware FOF1 to FOF3 on flash memories is stored. In the management region (firmware management region) K3, information for managing the FOF region R3 is stored.

The CIS/ID/parameter region R4 is a region in which the drive information ID (Identify Drive Information) of the memory card 1, information such as the name, kind, function, and the like of the memory card 1, CIS (Card Information Structure), various parameters, and the like are stored. The management region K4 stores information for managing the CIS/ID/parameter region R4. The spare table region R5 is a region for storing area spare region information. The management region K5 stores information for managing the spare table region R5.

The configuration of the management region K3 will be described by using the configuration diagram of FIG. 3.

As shown in the diagram, in the management region K3, a good sector code, FOF (firmware on flash memory) No., an identification code (firmware identification information), management ECC information, and the like are stored.

The good sector code is a code indicating whether each of the sectors in the FOF region R3 is normal or abnormal. The FOF (firmware on flash memory) No. is a number assigned to each of the firmware FOF1 to FOF3 on flash memories.

The identification code is a code indicative of a block (hereinbelow, called an FOF block) of each of the firmware FOF1 to FOF3 on flash memories stored in the FOF region R3 and is used for retrieving the FOF block. The management ECC information is ECC (Error Correcting Code) information used for making a data correction.

The action in the memory card 1 of the embodiment will now be described.

First, the operation of the memory card 1 in the case where an instruction of selecting the firmware FOF1 to FOF3 on flash memories (firmware selecting instruction) is given according to a parameter will be described with reference to the flowchart of FIG. 4.

In this case, a bit for selecting the firmware FOF1 to FOF3 on flash memories is provided for a parameter sector, and firmware on a flash memory selected by the selection bit is loaded by a resetting sequence performed at the time of power-on or the like.

First, in the resetting sequence, the CPU of the controller 3 reads a necessary parameter sector from the CIS/ID/parameter region R4 in the flash memory 2 and stores it into the external RAM 7 (step S101).

After that, the firmware on flash memory No. is obtained from the read parameter sector (step S102). By referring to the identification code in the management region K3 in the flash memory 2, whether the FOF region R3 exists in the flash memory 2 or not is checked (step S103).

If the FOF region R3 exists in the process of step S103, a process of retrieving an FOF block in the FOF region R3 is performed (step S104).

In the case where the FOF region R3 does not exist, the CPU accesses the built-in ROM 6 and makes the memory card 1 operate on the basis of a program stored in the built-in ROM 6.

The operation of the memory card 1 in the case where a firmware-on-flash-memory selecting instruction is given by using a command for selecting firmware on a flash memory will now be described by using the flowchart of FIG. 5.

First, when receiving a command for selecting firmware on a flash memory from the host device HT or the like, the CPU sets the command for selecting firmware on a flash memory into a task file register provided for the control logic 4 (step S201). The task file register is a register for transferring data to/from the host device HT by a normal command.

After that, a firmware on flash memory No. desired to be validated is set in the task file register (step S202). By referring to the identification code in the management region K3 in the flash memory 2, whether the FOF region R3 exists in the flash memory 2 or not is checked (step S203).

If the FOF region R3 exists in the process of step S203, a process for retrieving an FOF block in the FOF region R3 is performed (step S204). If the FOF region R3 does not exist, the CPU accesses the built-in ROM 6 and operates the memory card 1 on the basis of a program stored in the built-in ROM 6.

The operation of the memory card 1 in the case of an instruction for selecting arbitrary firmware on a flash memory during execution of a program will now be described with reference to the flowchart of FIG. 6.

As an example, the case of newly selecting and executing the firmware FOF2 on a flash memory during the process of the firmware FOF1 on a flash memory will be described. A process of newly selecting and executing any of the firmware FOF1 to FOF3 on flash memories during the process of a program in the built-in ROM 6 is similar to the example.

In the case where an arbitrary process is being executed on the basis of the firmware FOF1 on the flash memory (step S301), the CPU determines whether or not any of the other firmware FOF2 and FOF3 on flash memories which are not selected has to be processed due to occurrence of an interrupting process, an error process, or the like (step S302).

If any of the other firmware FOF2 and FOF3 on flash memories which are not selected has to be processed, the firmware-on-flash-memory No. to be selected is set (step S303).

By referring to an identification code in the management region K3 in the flash memory 2, whether the FOF region R3 exists in the flash memory 2 or not is detected (step S304).

In the case where the FOF region R3 exists in the process of step S304, the process of retrieving the FOF block in the FOF region R3 is performed (step S305).

In the case where the FOF region R3 does not exist, the CPU accesses the built-in ROM 6 and operates the memory card 1 on the basis of a program stored in the built-in ROM 6.

The process of retrieving the selected firmware on a flash memory in FIGS. 4 and 6 will now be described.

The process of retrieving the selected firmware on flash memory by using the identification code of the management region K3 will now be described with reference to the flowchart of FIG. 7.

First, the CPU reads the management region K3 from the head address of the FOF region R3 (step S401) and checks the identification code in the management region K3 (step S402). The CPU determines whether the identification code indicates an FOF block or not (step S403). If the checked identification code is a block code which does not indicate an FOF block in the process of step S403, the process is finished.

If YES in step S403, the firmware-on-flash-memory No. in the management region K3 is checked (step S404). On the basis of the firmware-on-flash-memory No., whether the FOF block in the process of step S403 corresponds to the firmware on a flash memory or not is determined (step S405).

If NO in step S405, the address of the FOF block is incremented (in the case of inverse-order search, the address of the FOF block is decremented) (step S406), and the processes in steps S402 to S405 are repeatedly executed.

When the corresponding FOF block is retrieved in the process of step S405, the firmware on the flash memory is loaded into the built-in RAM 5 (step S407) and the process by the firmware is executed.

By loading the firmware on the flash memory into the built-in RAM 5 which can be accessed at random, the CPU can execute a high-speed process.

The case of retrieving an FOF block while limiting the search range will now be described by using the flowchart of FIG. 8. In this case, an address value indicative of the range of an FOF block (FOF region R3) is set in a parameter sector.

First, from the parameter sector of the CIS/ID/parameter region R4, an FOF block search range is obtained (step S501).

Whether the head address of the FOF region R3 lies within the search range obtained from the parameter sector or not is determined (step S502). If NO, the process is finished.

If YES, the management region K3 is read (step S503) and the firmware-on-flash-memory No. in the management region K3 is checked (step S504).

Whether the FOF block corresponds to the firmware on a flash memory or not is determined from the checked firmware-on-flash-memory No. (step S505).

If NO in step S505, the address of the FOF block is incremented (in the case of inverse-order search, the address of the FOF block is decremented) (step S506), and the processes in steps S502 to S505 are repeatedly executed.

When the corresponding FOF block is retrieved in the process of step S505, the firmware on a flash memory is loaded into the built-in RAM 5 (step S507) and a process by the firmware is performed.

According to the embodiment, therefore, by setting a plurality of firmware on flash memories into the flash memory 2, multiple functions in the memory card 1 can be realized.

By the plurality of pieces of firmware on flash memories, without changing a program stored in the built-in ROM 6, a program can be easily, flexibly modified, changed, added, or the like.

Further, in the embodiment, each of firmware FOF1 to FOF3 on flash memories may be a program having an option function such as a program having a security function or the like.

Consequently, in the memory card 1, a program in the built-in ROM 6 can be commonly used irrespective of necessity of the security function, so that the cost of product management can be largely reduced.

Although the invention achieved by the inventor herein has been concretely described above on the basis of the embodiments of the invention, obviously, the invention is not limited to the foregoing embodiments but can be variously modified without departing from the gist.

For example, in the embodiment, the memory card has a configuration such that a plurality of pieces of firmware on flash memories is prestored in a flash memory. Alternately, new firmware on a flash memory may be added or firmware on a flash memory may be rewritten by an updating program or the like executed by the host device.

In the case of adding new firmware on a flash memory, for example, a spare region is provided in the FOF region in the flash memory and firmware on a flash memory to be added is stored in the spare region or firmware on a flash memory to be added is stored in another region such as a data block spare region.

With the configuration, the invention can address to modification, change, addition, or the like of a program more flexibly.

The flash memory in the foregoing embodiments may be a multivalue flash memory in which a plurality of threshold values of voltage levels is set and data of one bit or larger is stored in a single nonvolatile memory cell.

Effects obtained by representative ones of the inventions disclosed in the specification will be briefly described as follows.

(1) Multiple functions of a memory card can be realized and the invention can promptly address modification, addition, and the like of a program.

(2) By the effect (1), the invention can provide a low-cost memory card which can flexibly follow a change in market.

What is claimed is:

1. A nonvolatile memory card comprising:
   a nonvolatile semiconductor memory having a plurality of nonvolatile memory cells and capable of storing predetermined information; and
   a controller for giving an instruction of operation of said nonvolatile semiconductor memory based on a command issued from the outside,
   wherein said nonvolatile semiconductor memory can store two or more pieces of firmware,
   wherein said controller has a volatile semiconductor memory for storing said firmware, and when a firmware selecting instruction is made valid, said controller selects one arbitrary firmware from two or more pieces of firmware which can be stored in said volatile semiconductor memory, stores it in said volatile semiconductor memory, accesses said volatile semiconductor memory and executes a process by said firmware, and
   wherein said nonvolatile semiconductor memory is a multivalue flash memory for setting threshold voltage of one of said nonvolatile memory cells within one of a plurality of threshold voltage levels and storing data of one bit or larger into one of said nonvolatile memory cells.

2. The nonvolatile memory card according to claim 1, wherein a unit of reading data of said nonvolatile semiconductor memory is 512 bytes or larger.

3. The nonvolatile memory card according to claim 3, wherein at least one of the two or more pieces of firmware stored in said nonvolatile semiconductor memory is a program having a security function.

4. The nonvolatile memory card according to claim 4, wherein said controller retrieves firmware to be stored in said volatile semiconductor memory by using firmware identification information stored in a firmware management region in said nonvolatile semiconductor memory.

* * * * *